United States Patent Office 3,682,889
Patented Aug. 8, 1972

3,682,889
SUBSTITUTED DIAZIRIDINES AND DIAZIRINES
Robert J. Sauer, Wilmington, Del., assignor to E. I. du Pont de Nemours and Company, Wilmington, Del.
No Drawing. Continuation-in-part of application Ser. No. 582,242, Sept. 27, 1966. This application Mar. 2, 1970, Ser. No. 15,930
Int. Cl. C07d 23/00, 57/00
U.S. Cl. 260—239 AA     12 Claims

ABSTRACT OF THE DISCLOSURE

Alicyclic primary amines are reacted with alkali metal or tertiary alkyl hypohalites and the resulting product is reacted with ammonia to produce diaziridines. The diaziridines can be dehydrogenated by means of an alkali metal hypohalite to produce the corresponding diazirine that function as blowing agents for foaming polycaprolactam, polyvinyl chloride, polyethylene and other such polymers. The compounds have the formula

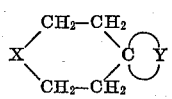

wherein Y is selected from the group consisting of

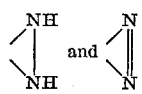

X is R—Z, wherein Z is selected from the group consisting of

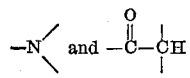

provided that when Z is

R is a hydrocarbon radical of from 1 to 10 carbon atoms free of olefinic unsaturation and provided further that when Z is

Y is

and R is selected from the group consisting of R'O— and R'R"N— wherein R' and R" are hydrocarbon radicals of from 1 to 10 carbon atoms free of olefinic unsaturation, and when Y is

R is selected from the group consisting of R'O—, R'NH— and R'R"N— wherein R' and R" are hydrocarbon radicals of from 1 to 10 carbon atoms; chlorine; OM, wherein M is alkali metal; OH, and NH$_2$.

CROSS-REFERENCE TO RELATED PATENT APPLICATION

This application is a continuation-in-part of application Ser. No. 582,242, filed Sept. 27, 1966, now abandoned.

BACKGROUND OF THE INVENTION

This invention relates to a process for the manufacture of spiro-compounds. More particularly, this invention is concerned with an improved process for the production of carbocyclic and heterocyclic diaziridines and diazirines, as well as certain new compounds obtained thereby. This invention is also concerned with preparation of diazirines containing easily modifiable functional groups, substituted on the carbocyclic portion of a spirodiazirine molecule, which may be modified after formation of the diazirine ring itself so as to introduce groups into the molecule which, in many cases, would not have survived conditions or reagents required to form the diazirine ring.

Diaziridines have conventionally been made by reacting carbonyl compounds with ammonia and chlorine or alkali hypochlorites to form diazirdines. The diaziridines have then been dehydrogenated to the corresponding diazirines by the use of specific oxidizing agents (i.e., yellow mercuric oxide, lead oxide, chromium trioxide, potassium dichromate, osmium tetroxide, and quinone) to yield the corresponding diazirines. These methods often necessitate the separation of a chlorinated intermediate, which separation significantly reduces product yields. The instant invention provides a process for the production of diazirdines and diazirines which gives these products in yields substantially greater than have been heretofore possible using the methods known to the art.

SUMMARY OF THE INVENTION

It has been discovered that diaziridines can be synthesized from alicyclic primary amines, by first contacting the amine with alkali metal hypohalites or tertiary alkyl hypohalites, and then contacting the resulting product with ammonia. The order in which the hypohalite and ammonia are reacted is a critical factor in obtaining the high yields of the instant invention. It has further been discovered that after separation of the diaziridine product, this product can be dehydrogenated with an alkali metal hypohalite to the corresponding diazirine. Furthermore, sensitive groups such as unsaturated hydrocarbon substituents may be introduced into the molecule subsequent to formation of the diazirine ring through use of easily modifiable functional groups which are unreactive to conditions and reagents required to form the diazirine ring, yet are themselves reactive toward other reagents bearing oxidatively susceptible groups under conditions which will not destroy the thermally sensitive diazirine ring.

The products resulting from the instant invention include not only those known in the art, but also certain new diazirine and diaziridine compounds of the formula:

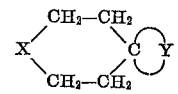

wherein Y is selected from the group consisting of

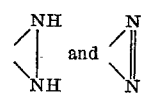

X is R—Z<, wherein Z is selected from the group consisting of

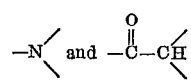

provided that when Z is —N<, R is a hydrocarbon radical of from one to ten carbon atoms free of olefinic unsaturation and provided further that when —Z is

Y is

R is selected from the group consisting of R'O— and R'R"N—, wherein R' and R" are hydrocarbon radicals of from one to ten carbon atoms free of olefinic unsaturation, and when Y is

R is selected from the group consisting of R'O—, R'NH— and R'R"N— wherein R' and R" are hydrocarbon radical of from one to ten carbon atoms; chlorine; OM, wherein M is an alkali metal; —OH, and NH₂.

DESCRIPTION OF PREFERRED EMBODIMENTS

The process of the instant invention is begun with alicyclic amines, such as carbocyclic amines having from five to seven and preferably six ring atoms, the amino moiety being bonded to ring carbon, examples of which are: cyclohexylamine, cyclopentyl amine and cycloheptyl amine; and carbocyclic amines having a substituent group attached to a ring atom; wherein said substituent group is an alkyl or aralkyl group having from one to ten carbon atoms, e.g., 4-methyl cyclohexyl amine; 3-methyl cyclohexyl amine; 4-ethyl cyclohexyl amine; 4-benzyl cyclohexyl amine and 4-octyl cyclohexyl amine; where said substituent group is an alkoxy group, e.g., 4-methyl cyclohexylamine and 4-ethoxycyclohexylamine; wherein said substituent group is a substituted or unsubstituted carboxy group, e.g., methyl 4-amino cyclohexane carboxylate, ethyl 4-amino cyclohexane carboxylate, 4-amino cyclohexane carboxylic acid.

The starting amines also include heterocyclic amines preferably having 5 to 7, and most preferably 6 ring atoms, the amino moiety being bonded to a ring carbon and the ring elements consisting of carbon and nitrogen, and the ring structure preferably containing only one ring nitrogen atom, examples of which are 4-amino piperidine; 2-amino pyrrolidine and 5-amino hexamethylenimine.

Heterocyclic amines having a substituent group on the ring structure, attached to the hetero atom, which can be used in the invention include those wherein said substituent group is an alkyl group of from 1–8 carbon atoms, e.g., 4-amino-1-methyl piperidine, 4-amino-1-ethyl piperidine, 4-amino-1-butyl piperidine; and those wherein said substituent group is an aryl group, e.g., 4-amino-1-aryl piperidine.

This starting amine is preferably dissolved in an organic solvent, which can be any solvent in which ammonia is readily soluble, e.g., diethyl ether, diglyme, methanol, ethanol, butanol, isopropanol, tertiary butanol and cyclohexanol.

Methanol is especially preferred because of the high solubility of ammonia in this solvent as well as its low cost and ready availability. The concentration of this solution usually is about 10 to 20 parts of amine per 100 parts of solvent.

A solution of primary amine is then contacted with a tertiary alkyl hypohalite of 4–10, and preferably 4, carbon atoms, e.g., tertiary butyl hypobromite, tertiary butyl hypoiodite, tertiary butyl hypochlorite, tertiary heptyl hypochlorite, and tertiary decyl hypochlorite or an alkali metal hypohalite, e.g., sodium hypochlorite or potassium hypochlorite. Tertiary butyl hypochlorite is especially preferred because of its ready availability and the higher yields obtained through its use. This initial reagent is dissolved in an organic solvent, such as those mentioned above. The use of an alcohol solvent similar to the hypohalite is preferred. Thus, if the tertiary butyl hypohalite is selected as a reagent, the use of tertiary butyl alcohol is preferred because of possible undesirable side reactions between the tertiary butyl hypohalite and solvents other than tertiary butyl alcohol. The concentration is usually about 1 to 2 parts of tertiary butyl hypohalite in about 1 part of solvent. It has been found advantageous to add the tertiary butyl hypohalite solution slowly to the amine solution, and the preferred temperature for such addition is from about —50 to +10° C.

The contacting of the amine with tertiary butyl hypohalite is followed by the addition of about 3 to 10 parts of ammonia to the reaction mixture so that the solution will be saturated with ammonia at 20–25° C. The ammonia is most conveniently added in its gaseous state, the temperature for such addition preferably being about +10° to —50° C., and preferably about —20° to —30° C.

Upon completion of the ammonia addition, the reaction mixture can be allowed to equilibriate to an ambient temperature of about 25° C.±10° C.

Completion of the reaction to an equilibrium state can take from about five to twenty hours, with a preferred reaction time of about 16 hours.

The diaziridine reaction product is separated at this point by methods well known to those skilled in the art, e.g., distillation, and the specific method used is not critical to this invention.

One method which can be used to advantage is to evaporate the excess solvent under reduced pressure, extract the solid residue, e.g., with methylene chloride, dry the resulting solution, e.g., over anhydrous sodium sulfate and evaporate under reduced pressure, and sublime or distill the remaining residue under reduced pressure.

The resulting spiro diaziridines bear two rings, the smaller of said rings being a three-membered ring having two nitrogen atoms and one carbon atom, said carbon atom being the spiro atom. The larger of the two said rings corresponds to the cyclic ring structure of the original amine and can be, e.g., a carbocyclic ring having from five to seven and preferably six ring atoms.

Examples of the diaziridine products are: pentamethylene diaziridine; hexamethylene diaziridine and tetramethylene diaziridine; examples of substituted diaziridines include those wherein said substituent group is an alkyl group having from one to eight carbon atoms, e.g., 6 - methyl-1,2-diazaspiro[2.5]octane; 5-methyl-1,2-diazaspiro[2.5]octane; and 6-ethyl-1,2-diazaspiro[2.5]octane; those wherein said substituent group is an aralkyl, e.g., 6-benzyl-1,2-diazaspiro[2.5]octane; those wherein said substituent group is an alkoxy group, e.g., 6-methoxy-1,2-diazaspiro[2.5]octane; 6 - ethoxy-1,2-diazaspiro[2.5]octane; 6 - isopropoxy-1,2-diazaspiro[2.5]octane; those wherein said substituent group is an alkoxy carbonyl or a carboxy group, e.g., methyl-1,2-diazaspiro[2.5]octane-6-carboxylate; ethyl-1,2-diazaspiro[2.5]octane - 6 - carboxylate; isopropyl-1,2-diazaspiro[2.5]octane - 6 - carboxylate and 1,2-diazaspiro[2.5]octane-6-carboxylic acid.

Examples of diaziridines of this invention wherein the larger of said rings is a heterocyclic ring having from five to seven and preferably six ring atoms, the ring components comprising carbon and up to one nitrogen, include, e.g., 1,2,5-triazaspiro[2.4]heptane; 1,2,6-triazaspiro[2.5]nonane; 1,2,6 - triazapiro[2.5]octane; those wherein a substituent group is attached to the nitrogen atom in said larger ring, those wherein said substituent group is an alkyl group having from one to eight carbon atoms, e.g., 6-methyl-1,2,6-triazispiro[2.5]octane; 6-ethyl-1,2,6-triazispiro[2.5]octane; and 6-butyl-1,2,6-triazaspiro[2.5]octane; those wherein said substituent group is an aralkyl group, e.g., 6-benzyl-1,2,6-triazispiro[2.5]octane.

The purified diaziridine product can then be oxidized through the use of alkali metal hypohalogen compounds, e.g., sodium hypochlorite, sodium hypobromite, and sodium hypoiodite to form the corresponding diazirine.

The oxidation of the diaziridine is preferably carried on in solution, the diaziridine being dissolved in a suitable organic solvent, e.g., methylene chloride, a petroleum ether, a chloroform, Freons, or carbon tetrachloride. The particular concentration of this solution is not critical to the invention, but concentrations of from about 10 to 20 parts of diaziridine per 100 parts of solvent are preferred. This diaziridine solution can be added to an alkali metal hypohalogen solution preferably of a concentration of from 5 to 10 parts of hypohalogen compound to 100 parts of water. The oxidation reaction is preferably carried out in an alkaline medium of pH 7, and preferably pH from about pH 8 to pH 11. To adjust the pH, small amounts of base, e.g., alkaline earth carbonates and bicarbonates such as sodium carbonate and magnesium carbonate, can be added to the reaction mixture.

The oxidation reaction is preferably carried out at a temperature of about from —7 to 0° C. It has been found advantageous to add the diaziridine solution slowly, e.g., over a 15–60 minute period, to the hypohalogen solution.

After completion of the reaction, the diazirine product can be extracted and purified by methods well known to those skilled in the art, e.g., distillation.

The resulting spiro diazirines bear two rings, the smaller of said rings being a three-membered ring having two nitrogen atoms and one carbon atom, said carbon atom being the spiro atom. The larger of the two said rings corresponds to the cyclic ring structure of the original amine and can be, e.g., a carbocyclic ring having from five to seven and preferably six ring atoms.

Examples of such diazirine products are: pentamethylene diazirine; hexamethylene diazirine and tetramethylene diazirine; examples of substituted diazirines include those wherein said substitutent group is an alkyl group having from one to eight carbon atoms, e.g., 6-methyl-1,2 - diazaspiro[2.5]oct - 1 - ene; 5 methyl-1,2-diazaspiro[2.5]oct-1-ene; and 6-ethyl-1,2-diazaspiro[2.5]oct-1-ene; those wherein said substituent group is an alkoxy group, e.g., 6-methoxy-1,2-diazaspiro[2.5]oct-1-ene; 6-ethoxy - 1,2 - diazaspiro[2.5]oct-1-ene; 6-isopropoxy-1,2-diazaspiro[2.5]oct-1-ene; those wherein said substituent group is a cyano group, e.g., 6-cyano-1,2-diazaspiro[2.5]oct-1-ene; those wherein said substituent group is a substituted or unsubstituted carboxy group, e.g., methyl-1,2 - diazaspiro[2.5]oct - 1-ene-6-carboxylate; ethyl-1,2-diazaspiro[2.5]oct-1-ene-6-carboxylate; and isopropyl-1,2-diazaspiro[2.5]oct-1-ene-6-carboxylic acid.

Such diazirines as the last named 1,2-diazaspiro[2.5] 1-ene carboxylic esters or acid bearing modifiable functional groups such as alkoxy carbonyl and carboxyl may be transformed into other diazirines which may now contain unsaturated hydrocarbon substituents, i.e., sensitive groups having, for example, olefinic unsaturation. Such transformations may be carried out by known process of ester interchange, aminolysis of esters and esterification or amidation by way of carboxylic acid halides as exemplified more particularly in examples given hereinbelow.

Examples of diazirines of this invention wherein the larger of said rings is a heterocyclic ring having from five to seven and preferably six ring atoms, the ring components comprising carbon and up to one nitrogen, include, e.g., 1,2,5-triazaspiro[2.5]-hept-1-ene; 1,2,6-triazaspiro[2.6]non-1-ene; and 1,2,7-triazaspiro[2.6]non-1-ene; 1,2,6-triazaspiro[2.5]oct-1-ene; those wherein a substituent group is attached to the nitrogen atom in said larger ring, those wherein said substituent group is an alkyl group having from one to eight carbon atoms, e.g., 6 - methyl - 1,2,6 - triazaspiro[2.5]oct - 1 - ene; 6-ethyl- 1,2,6 - triazaspiro[2.5]oct - 1 - ene; and 6-butyl-1,2,6-triazaspiro[2.5]oct-1-ene; those wherein said substituent group is an aryl group, e.g., 6-aryl-1,2,6-triazaspiro[2.5]oct-1-ene.

The diaziridine compounds of the invention are useful as intermediate in the production of diazirines, as herein disclosed. The diazirine compounds themselves are much more chemically stable than their linear isomers, for which reason, they can be decomposed at a controlled and uniform rate. The gas evolved from this decomposition makes the diazirines useful as blowing agents in the manufacture of foams. This blowing agent can be used for foaming caprolactam, polyvinyl chloride, polyethylene, polypropylene, polyurethane, polystyrene, polychloroprene, and other such polymers in the same general manner as conventional chemical blowing agents. Moreover, Grignard reagents add to the —N=N— bond of the diazirines, making them useful intermediates.

1,2-diazaspiro[2.5]oct-1-ene-6-carboxylic acid can be treated to form other novel diazirines. This acid can be made directly by the process of the instant invention or by contacting methyl-1,2-diazaspiro[2.5]oct-1-ene-6-carboxylate with a strong base followed by contacting the resulting solution with a mineral acid. The resulting diazirine acid, upon contacting it with an alkali base, e.g., sodium hydroxide, will yield the alkali metal salt of the diazirine acid.

The novel compounds of this invention in which a nitrogen atom is a member of the larger ring may be treated with saturated or unsaturated alkyl halides to form the corresponding quaternary ammonium salt. This treatment facilitates the water solubility of the compounds of the instant invention.

Treatment of the diazirine acid with thionyl chloride produces the corresponding acid chloride. This acid chloride, upon being contacted with a substituted or unsubstituted phenol will form the corresponding phenyl-1,2-diazaspiro[2.5]oct-1-ene carboxylate. Additionally, contacting the diazirine acid with hydrazine will produce 1,2 - bis(1,2 - diazaspiro[2.5]oct - 1-ene-6-carbonyl)hydrazine. These compounds are also useful as blowing agents.

In the following examples which illustrate the invention, parts and percentages are by weight unless otherwise indicated.

Example 1.—6-methyl-1,2,6-triazaspiro[2.5]octane

To a solution of 2.76 parts of 4-amino-1-methyl-piperidine in 79 parts of dry methanol is added, at —30° C., 5.23 parts of t-butyl hypochlorite in 10–15 parts of t-butyl alcohol. Seventeen parts of liquid ammonia is distilled into the solution and the mixture is allowed to warm slowly to room temperature. After five hours, the methanol is evaporated, the residue extracted with 250 parts of methylene chloride, the resulting solution dried over anhydrous sodium sulfate and evaporated under reduced pressure. The residue is sublimed under vacuum to give 0.85 part of colorless solid, 6-methyl-1,2,6-triazaspiro[2.5]octane, M.P. 88–93. Yield: 31%.

*Anaylsis.*—Calcd. for $C_6H_{13}N_3$ (percent): C, 56.63; H, 10.30; N, 33.04. Found (percent): 56.66, 56.94, 10.44, 10.52; 32.96, 33-18.

The structural formula of the product is:

In a like manner, if the procedure described above is repeated using equivalent amount of 4-amino-1-ethyl piperidine, 4-amino-1-cyclohexyl piperidine, and 4-amino-1-benzyl piperidine instead of 4-amino-methyl piperidine, 6 - ethyl - 1,2,6-triazaspiro[2.5]octane, 6-cyclohexyl-1,2,6-triazaspiro[2.5]octane and 6-benzyl-1,2,6,-triazaspiro[2.5]octane, respectively, are obtained.

Example 2.—1,2-diazaspiro[2.5]octane

A solution of 7.15 parts cyclohexylamine in 79 parts methanol is cooled to −30° C. and 15.85 parts t-butyl hypochlorite in 15 parts t-butyl alcohol are added dropwise thereto. Twenty-one parts of anhydrous ammonia is distilled into the solution in a stream of nitrogen. The solution is allowed to stand at 20–25° C. for three days.

Evaporation of methanol, extraction with methylene chloride and sublimation of the residue from the methylene chloride solution gives 5.25 parts of 1,2-diazaspiro-[2.5]octane. Yield 73%.

The structural formula of the product is:

In a like manner, if the procedure described above is repeated using equivalent amounts of methyl-4-amino cyclohexane, and ethyl-4-amino cyclohexane instead of cyclohexylamine, 6-methyl-1,2-diazaspiro[2.5]octane and 6-ethyl-1,2-diazaspiro[2.5]octane, respectively, are obtained.

Example 3.—Pentamethylene diazirine (1,2-diazaspiro[2.5]oct-1-ene)

To a solution of 380 parts of "Clorox" (5.25% of sodium hypochlorite) and 18.9 parts of sodium carbonate cooled to 5° C. is added, dropwise with vigorous stirring over 30 minutes, a solution of 20 parts of pentamethylene diaziridine in 150 parts of methylene chloride.

The methylene chloride layer is washed twice with water, dried over anhydrous sodium sulfate and distilled through a short Vigreux column under reduced pressure to give 11 parts of pentamethylene diazirine. Yield: 55%.

The structural formula of the product is:

In a like manner, if the procedure described above is repeated using equivalent amounts of 6-methyl-1,2-diazaspiro[2.5]octane, 6 - ethyl-1,2-diazaspiro[2.5]octane instead of pentamethylene diaziridine, 6-methyl-1,2-diazaspiro[2.5]oct-1-ene and 6-ethyl-1,2-diazaspiro[2.5]oct-1-ene, respectively, are obtained.

Example 4.—Methyl-1,2-diazaspiro[2.5]octane-6-carboxylate

Thirty parts of methyl p-aminobenzoate is hydrogenated over 1.0 part of ruthenium dioxide at 90–95° C. under 1200 p.s.i. for 5 hours in methanol. Removal of methanol and distillation of the residue gives 22 parts of methyl-4-aminocyclohexane carboxylate. The resulting 4-aminocyclohexane carboxylate is contacted with t-butyl hypochlorite and anhydrous ammonia according to the method of Example 2. Upon purification, methyl-1,2-diazaspiro-[2.5]octane-6-carboxylate is obtained in 65% yield.

The structural formula of the product is:

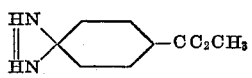

In a like manner, if the procedure described above is repeated using equivalent amounts of ethyl-4-aminocyclohexane carboxylate, 4-aminocyclohexane carboxylic acid instead of methyl-4-aminocyclohexane carboxylate, ethyl-1,2 - diazaspiro[2.5]octane-6-carboxylate and 1,2-diazaspiro[2.5]octane carboxylic acid are obtained.

Example 5.—Methyl-1,2-diazaspiro[2.5]oct-1-ene-6-carboxylate

To a solution of 17 parts of 5.25% sodium hypochlorite solution and 1.0 part of sodium carbonate cooled to 5° C. is added, dropwise with vigorous stirring over a 30-minute period, a solution of 1.0 part of methyl-1,2-diazaspiro[2.5]octane carboxylate. Distillation of the product gives 0.610 part of methyl-1,2-diazaspiro[2.5]oct-1-ene-6-carboxylate. Yield: 62%.

*Analysis.*—Calcd. for $C_8H_{12}N_2O_2$ (percent): C, 57.12; H, 7.19; N, 16.66. Found (percent): 57.17, 57.14; 7.21, 7.20; 17.09, 17.20.

When the preceding oxidation is carried out on 4.0 parts of the carbomethoxy diaziridine, the yield of distilled product is increased to 82%.

The structural formula of the product is:

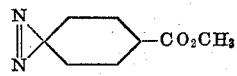

In a like manner, if the procedure described above is repeated using equivalent amounts of ethyl-1,2-diazaspiro-[2.5]octane-6-carboxylate, and 1,2-diazaspiro[2.5]octane carboxylic acid instead of methyl-1,2-diazaspiro[2.5]octane carboxylate, ethyl-1,2-diazaspiro[2.5]oct-1-ene carboxylate and 1,2 - diazaspiro[2.5]oct-1-ene-6-carboxylic acid are obtained.

Example 6.—1,2-diazaspiro[2.5]oct-1-ene-carboxylic acid

To one part of methyl-1,2-diazaspiro[2.5]oct-1-ene-6-carboxylate is added four parts of sodium hydroxide in 36 parts of water, and the reactants are stirred for 3–4 hours at room temperature.

The mixture is acidified, extracted with methylene chloride, dried and evaporated under reduced pressure.

1,2-diazaspiro[2.5]oct-1-ene carboxylic acid is obtained in 92% yield.

*Analysis.*—Calcd. for $C_7H_{10}N_2O_2$ (percent): C, 54.52; H, 6.54; N, 18.17. Found (percent): 54.24, 54.49; 6.88, 7.02; 18.22, 18.27.

Example 7.—Sodium-1,2-diazaspiro[2.5]oct-1-ene-6-carboxylate

To one part of pentamethylene diazirine carboxycyclic acid in solution with 10 parts of acetone and 10 parts water is added one part sodium hydroxide. After evaporation of the solvent under vacuum, the sample is freeze-dried to give the corresponding sodium salt in 100% yield.

Example 8.—1,2-diazaspiro[2.5]oct-1-ene-6-carbonyl chloride

One part of 1,2-diazaspiro[2.5]oct-1-ene carboxylic acid is added to 30 parts of thionyl chloride at 0–5° C. The solution is warmed to 40–50° C. for 1.5 hours. Upon vacuum distillation, the corresponding acid chloride is obtained in 69% yield.

Example 9.—Phenyl-1,2-diazaspiro[2.5]oct-1-ene-6-carboxylate

One part of 1,2-diazaspiro[2.5]oct-1-ene-6-carbonyl chloride in 35 parts methylene chloride is cooled to 0–5° C. Fifteen parts methylene chloride containing 0.65 part phenol is added slowly, followed by two parts of triethylamine in 15 parts methylene chloride. The reaction mixture is allowed to return to room temperature and then stirred for 30 minutes. The resulting product is then washed with water, cold 3 N hydrochloric acid and water, dried, and the solvent removed by evaporation under vacuum.

Phenyl - 1,2 - diaspiro[2.5)oct - 1 - ene - 6 - carboxylate is obtained in 80% yield.

Example 10.—Allyl-1,2-diazaspiro[2.5]oct-1-ene-6-carboxylate

The procedure described in Example 9 is repeated except 0.5 part allyl alcohol is substituted for phenol resulting in the formation of allyl-1,2-diazaspiro[2.5]oct-1-ene-6-carboxylate.

Example 11.—1,2-bis(1,2-diazaspiro[2.5]oct-1-ene-6-carbonyl)hydrazine

A solution of 0.4 part of hydrazine hydrate and one part of triethylamine in 30 parts of methylene chloride is cooled to 0–5° C. 0.8 part of 1,2-diazaspiro[2.5]oct-1-ene-6-carbonyl chloride in 15 parts of methylene chloride is added. The solution is allowed to return to room temperature and is stirred for 30 minutes. The solvent is evaporated under reduced pressure and the residue is washed with water and methanol. 1,2-bis(1,2-diazaspiro[2.5]oct-1-ene-6-carbonyl)hydrazine is obtained in 30% yield. The structural formula of the product is:

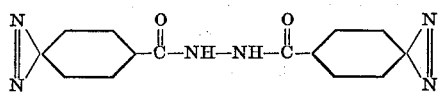

Example 12.—N-allyl-1,2-diazaspiro[2.5]oct-1-ene-4-carboxamide 1,2 - diazaspiro[2,5]oct - 1 - ene - 6 - carboxylic acid (1.05 part) is added in several portions at 0–5° C. to 25 parts of thionyl chloride. After stirring at room temperature for 2 hours the mixture is warmed to 40° C. for one hour. Excess thionyl chloride is removed under reduced pressure and the residual oil cooled in ice and treated with 7.6 parts of allyl amine in 15 parts of methylene chloride. Solvent and excess amine are evaporated after one hour, the residue extracted with water and carbon tetrachloride and the organic extract evaporated to dryness. Recrystallization of the residue from chloroform/cyclohexane gives cream-colored needles, M.P. 104–105° C. Sublimation at 50–60° C. under high vacuum gives a colorless solid having a melting point of 108–109° C. which is N-allyl-1,2-diazaspiro[2.5]oct-1-ene-6-carboxamide.

*Analysis.*—Calcd. for $C_{10}H_{15}N_3O$ (percent): C, 62.17; H, 7.82; N, 21.75. Found (percent): C, 62.10, 62.32; H, 8.20, 8.04; N, 21.96, 22.14. I.R.: $\nu_{CO}$ 1655, 1505; $\nu_{N-N}$ 1570; $\nu_{N-H}$ 3450, 3320 cm.$^{-1}$.

The NMR spectrum is completely consistent with the proposed structure: $\tau \sim 9.27$, $\sim 8.10$ (multiplets, ring —CH$_2$— and

9 protons); $\tau$ 6.10 (broadened triplet, allyl —CH$_2$—; 2 protons); $\tau$ 5.1 to 3.7 (complex multiplets, allyl CH$_2$=CH—; 3 protons) and $\tau$ 7.29 (broad singlet, amide >N—H; 1 proton).

Example 13.—N-allyl-N-propyl-1,2-diazaspiro[2.5]oct-1-ene-6-carboxamide

The procedure described in Example 12 is repeated except 17.4 parts of N-allyl-N-propylamine is substituted for allyl amine, thus resulting in the formation of N-allyl-N-propyl-1,2-diazaspiro[2.5]oct-1-ene-6-carboxamide.

Example 14.—N-cyclohexyl-1,2-diazaspiro[2.5]oct-1-ene-6-carboxamide

The procedure described in Example 12 is repeated except 17.4 parts cyclohexylamine is substituted for allyl amine, thus resulting in the formation of N-cyclohexyl-1,2-diazaspiro[2.5]oct-1-ene-6-carboxamide.

Example 15.—N-(2-octyl)-1,2-diazaspiro[2.5]oct-1-ene-6-carboxamide

The procedure described in Example 12 is repeated except 22.6 parts of 2-octyl amine is substituted for allyl amine, thus resulting in the formation of N-(2-octyl)-1,2-diazaspiro[2.5]oct-1-ene-6-carboxamide.

Example 16.—N-methyl-1,2-diazaspiro[2.5]oct-1-ene-6-carboxamide

Into a solution of one part 1,2-diazaspiro[2.5]oct-1-ene-6-carbonyl chloride in 15 parts methylene chloride, cooled to 0–5° C., are distilled 10 parts methyl amine. The product is isolated according to the procedure of Example 12 and identified as N-methyl-1,2-diazaspiro[2.5]oct-1-ene-6-carboxamide.

I claim:
1. Compound of the formula

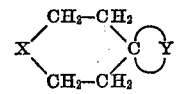

wherein Y is selected from the group consisting of

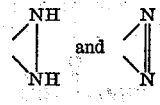

X is

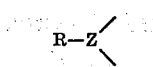

wherein Z is selected from the group consisting of

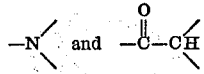

provided that when Z is

R is a hydrocarbon radical of from 1 to 10 carbon atoms free of olefinic unsaturation and provided further that when Z is

and Y is

R is selected from the group consisting of R'O— and R'R"N— wherein R' and R" are hydrocarbon radicals of from 1 to 10 carbon atoms free of olefinic unsaturation, and when Y is

R is selected from the group consisting of R'O—, R'NH— and R'R"N— wherein R' and R" are hydrocarbon radicals of from 1 to 10 carbon atoms; chlorine; OM, wherein M is an alkali metal; OH, and NH$_2$.

2. Compounds of the formula

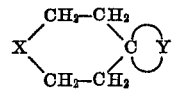

wherein Y is

X is

wherein Z is selected from the group consisting of

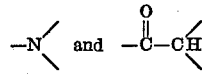

provided that when Z is

R is a hydrocarbon radical of from 1 to 10 carbon atoms free of olefinic unsaturation and provided further that when Z is $$-\overset{O}{\underset{\parallel}{C}}-C\overset{\diagup}{\underset{\diagdown}{H}}$$

R is selected from the group consisting of R'O— and R'R''$_2$N—, wherein R' and R'' are hydrocarbon radicals of from 1 to 10 carbon atoms free of olefinic unsaturation.

3. A compound of claim 2 wherein X is $$CH_3O-\overset{O}{\underset{\parallel}{C}}-C\overset{\diagup}{\underset{\diagdown}{H}}$$

4. A compound of claim 2 wherein X is $$CH_3N\overset{\diagup}{\underset{\diagdown}{}}$$

5. A compound of the formula $$X\overset{CH_2-CH_2}{\underset{CH_2-CH_2}{\diagdown\diagup}}C\overset{\diagup}{\underset{\diagdown}{Y}}$$

wherein Y is $$\overset{N}{\underset{N}{\diagup\!\!\!\diagdown}}$$

X is $$R-Z\overset{\diagup}{\underset{\diagdown}{}}$$

wherein Z is selected from the group consisting of $$-N\overset{\diagup}{\underset{\diagdown}{}} \text{ and } -\overset{O}{\underset{\parallel}{C}}-C\overset{\diagup}{\underset{\diagdown}{H}}$$

provided that when Z is $$-N\overset{\diagup}{\underset{\diagdown}{}}$$

R is a hydrocarbon radical of from 1 to 10 carbon atoms free of olefinic unsaturation and provided further that when Z is $$-\overset{O}{\underset{\parallel}{C}}-C\overset{\diagup}{\underset{\diagdown}{H}}$$

R is selected from the group consisting of R'O—, R'NH— and R'R''N—, wherein R' and R'' are hydrocarbon radicals of from 1 to 10 carbon atoms; chlorine; OM, wherein M is an alkali metal; OH; and NH$_2$.

6. A compound of claim 5 wherein X is $$CH_3O-\overset{O}{\underset{\parallel}{C}}-C\overset{\diagup}{\underset{\diagdown}{H}}$$

7. A compound of claim 5 wherein X is $$CH_3N\overset{\diagup}{\underset{\diagdown}{}}$$

8. A compound of claim 5 wherein X is $$C_6H_5O-\overset{O}{\underset{\parallel}{C}}-C\overset{\diagup}{\underset{\diagdown}{H}}$$

9. A compound of claim 5 wherein X is $$HO-\overset{O}{\underset{\parallel}{C}}-C\overset{\diagup}{\underset{\diagdown}{H}}$$

10. A compound of claim 5 wherein X is $$Cl-\overset{O}{\underset{\parallel}{C}}-C\overset{\diagup}{\underset{\diagdown}{H}}$$

11. A compound of claim 5 wherein X is $$CH_2=CH-CH_2-NH-\overset{O}{\underset{\parallel}{C}}-C\overset{\diagup}{\underset{\diagdown}{H}}$$

12. A compound of the formula:

$$\underset{N}{\overset{N}{\diagdown\!\!\!/}}\!\!\!\diagdown\!\!\!\!\!\bigcirc\!\!\!\!\!-\overset{O}{\underset{\parallel}{C}}-NH-NH-\overset{O}{\underset{\parallel}{C}}-C\overset{CH_2-CH_2}{\underset{CH_2-CH_2}{\diagup\diagdown}}C\overset{N}{\underset{N}{\diagdown\!\!\!\parallel\!\!\!\diagup}}$$

References Cited
UNITED STATES PATENTS

| | | | |
|---|---|---|---|
| 3,171,834 | 3/1965 | Paulsen | 260—239 |
| 3,287,354 | 11/1966 | Fuchs | 260—239 |
| 3,290,289 | 12/1966 | Fuchs | 260—239 |

OTHER REFERENCES

Smith: Open-Chain Nitrogen Compounds, vol. I, (New York, 1965), p. 201.

Schmitz et al.: Ber. Deut. Shem., vol. 94, pp. 2166–2173 (1961).

ALTON D. ROLLINS, Primary Examiner

U.S. Cl. X.R.

260—2.5 R, 2.5 AC, 2.5 N, 293.69, 326.85, 326.86